US012719880B2

(12) United States Patent
Kiehne et al.

(10) Patent No.: US 12,719,880 B2
(45) Date of Patent: Aug. 25, 2026

(54) PARTICIPATIVE SAFETY PROTOCOL FOR DATA CLOUD-BASED FUNCTIONS

(71) Applicant: Robert Bosch GmbH, Stuttgart (DE)

(72) Inventors: Holger Kiehne, Peine (DE); Johannes Morgenroth, Hildesheim (DE); Philip Wette, Bueckeburg (DE); Sascha Guebner, Bodenburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 96 days.

(21) Appl. No.: 18/711,265

(22) PCT Filed: Nov. 22, 2022

(86) PCT No.: PCT/EP2022/082730
§ 371 (c)(1),
(2) Date: Jun. 14, 2024

(87) PCT Pub. No.: WO2023/094354
PCT Pub. Date: Jun. 1, 2023

(65) Prior Publication Data

US 2025/0016168 A1 Jan. 9, 2025

(30) Foreign Application Priority Data

Nov. 25, 2021 (DE) ..................... 10 2021 213 282.0

(51) Int. Cl.
*H04L 9/40* (2022.01)

(52) U.S. Cl.
CPC .................................. *H04L 63/105* (2013.01)

(58) Field of Classification Search
None
See application file for complete search history.

(56) References Cited

U.S. PATENT DOCUMENTS

2020/0145337 A1* 5/2020 Keating .............. H04L 47/2425
2021/0026691 A1 1/2021 Hamann et al.
(Continued)

FOREIGN PATENT DOCUMENTS

DE 102011000621 A1 8/2011
DE 102014200226 A1 7/2015
(Continued)

OTHER PUBLICATIONS

Bennaceur, et al.: "Won't Take No for an Answer: Resource-driven Requirements Adaptation," (2019) IEEE/ACM 14th Symposium on Software Engineering for Adaptive and Self-Managing Systems (SEAMS), Canada, pp. 77-88.
(Continued)

*Primary Examiner* — Scott B Christensen
(74) *Attorney, Agent, or Firm* — NORTON ROSE FULBRIGHT US LLP

(57) ABSTRACT

A method for distributing communication resources between subfunctions of a function, executable on two or more executability levels, of a communication system for a vehicle. The method includes ascertaining a communication resource requirement of the function on a first executability level, provided by subfunctions of the function; checking whether the communication resource requirement is able to be met with available communication resources; if not, determining at least one of the subfunctions that is able, with the available communication resources, to provide only a second executability level that is restricted in relation to the first executability level; distributing available communication resources between the two or more subfunctions comprising restricting the available communication resources for one or more other subfunctions that differ from the at least one subfunction, so that the two or more subfunctions
(Continued)

provide the second executability level of the function following the restriction.

13 Claims, 3 Drawing Sheets

(56) References Cited

U.S. PATENT DOCUMENTS

| | | | | |
|---|---|---|---|---|
| 2021/0149729 | A1* | 5/2021 | Wang | G06F 9/5011 |
| 2022/0035662 | A1* | 2/2022 | Wiggers | G06F 9/505 |
| 2022/0179672 | A1* | 6/2022 | Chawla | G06F 9/45541 |
| 2022/0398189 | A1* | 12/2022 | Jansen | G06F 9/5011 |

FOREIGN PATENT DOCUMENTS

| | | | |
|---|---|---|---|
| DE | 102019204940 | A1 | 10/2020 |
| DE | 102019208519 | A1 | 12/2020 |

OTHER PUBLICATIONS

International Search Report issued in PCT/EP2022/082730 on Mar. 16, 2023.

Alia, et al.: “A Component-Based Planning Framework for Adaptive Systems,” OTM (2006), LNCS 4276, pp. 1686-1704, Springer-Verlag Berlin Heidelberg 2006.

* cited by examiner

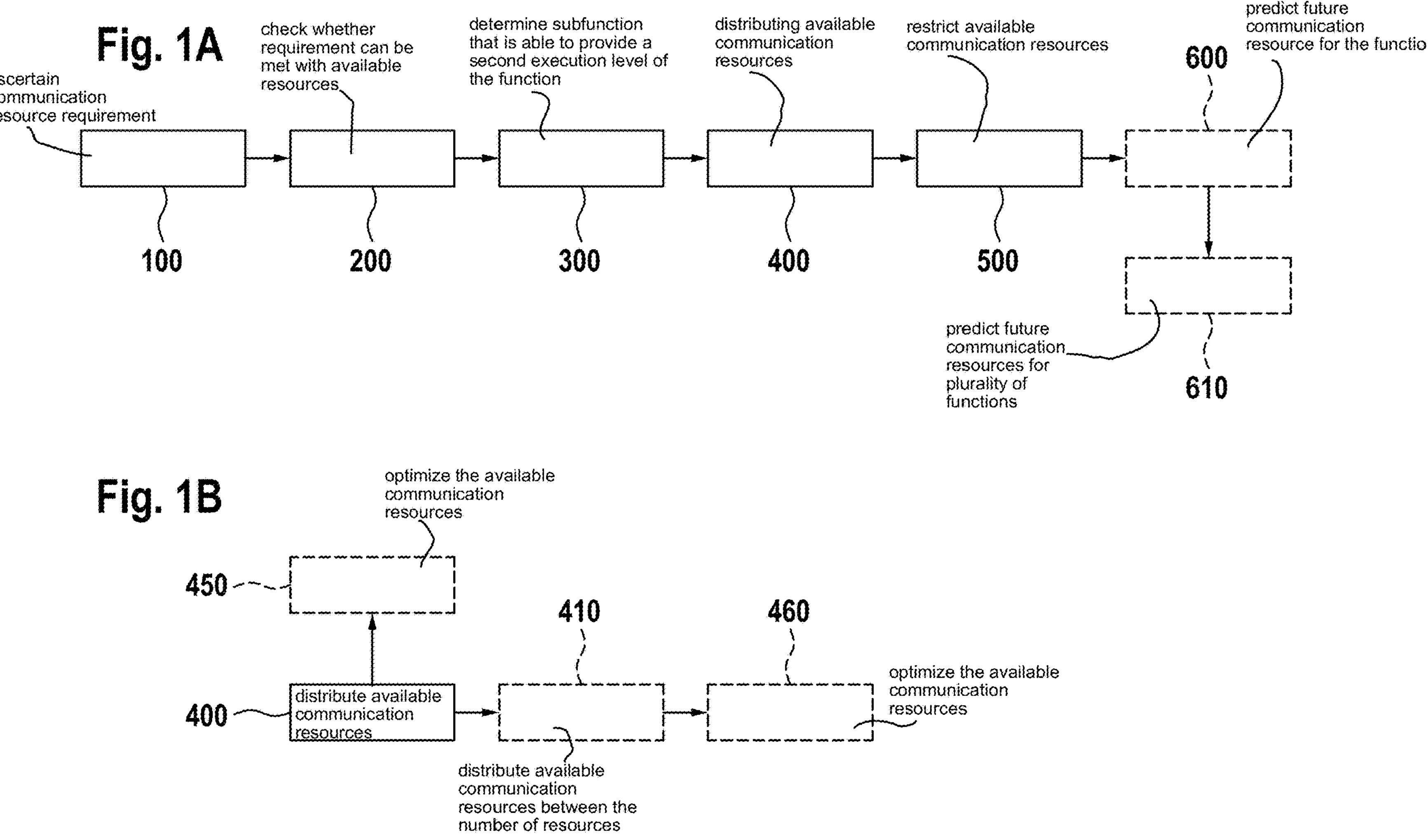
Fig. 1A
ascertain communication resource requirement
100
check whether requirement can be met with available resources
200
determine subfunction that is able to provide a second execution level of the function
300
distributing available communication resources
400
restrict available communication resources
500
predict future communication resource for the function
600
predict future communication resources for plurality of functions
610
Fig. 1B
optimize the available communication resources
450
400
distribute available communication resources
410
distribute available communication resources between the number of resources
460
optimize the available communication resources 1
Fun A
2
safety protocol
3
optimizer
4
pQoS unit
5
safety protocol
3
Fun B
2
Cloud
2
3

11
100%
10
20
21
22
23
24
UF
UTF1
UTF2

PARTICIPATIVE SAFETY PROTOCOL FOR DATA CLOUD-BASED FUNCTIONS

FIELD

The present invention relates to techniques for distributing communication resources between subfunctions of a function of a communication system for a vehicle. Related aspects concern a computer program and a communication system.

BACKGROUND INFORMATION

In the area of functional safety (for example, in the sense of IEC 61508 or ISO 26262), some existing methods of the related art relate the recognition of an error and the response thereto mainly to the faulty functions or components (for example, vehicle components). Other functions or components in the affected active chain of the function only respond to an error in the sense that the safe state is reached for the entire system. To this end, the function is often restarted, if possible, within a permissible time, in the hope that this will rectify the error state or otherwise switch off or deactivate the faulty function. In some cases, some methods of the related art allow switching to an alternative operating mode of the faulty function for individual errors of a particular group. However, in the event of an error, some methods of the related art do not include all functions and/or components that can participate in resolving the error or specifying an optimal distribution of communication resources between the functions at a particular point in time.

Therefore, there is a need to develop new technologies for a vehicle that can solve some or all of the aforementioned problems.

SUMMARY

A first general aspect of the present invention relates to a method for distributing communication resources between subfunctions of a function of a communication system for a vehicle, wherein the function is designed to be executed in two or more executability levels. According to an example embodiment of the present invention, the method comprises ascertaining a communication resource requirement of a function in a first executability level. A communication resource of the first aspect is required to execute the function. Moreover, the function of the first aspect comprises two or more subfunctions, which together provide the first executability level of the function. In a next step, the method comprises checking whether the communication resource requirement of the function is able to be met with available communication resources. Furthermore, the method comprises the following steps if the communication resource requirement is not able to be met:

Determining at least one subfunction of the two or more subfunctions that is able, with the available communication resources, to provide not the first executability level of the function but rather a second executability level of the function that is restricted in relation to the first executability level, Distributing available communication resources between the two or more subfunctions based on the communication resource requirement of the function. In addition, distributing the available communication resources of the first aspect comprises restricting the available communication resources for one or more other subfunctions from the two or more subfunctions that differ from the at least one subfunction, so that the two or more subfunctions provide the second executability level of the function following the restriction.

A second general aspect of the present invention relates to a computer program that is designed to execute the method according to the first general aspect of the present invention.

A third general aspect of the present invention relates to a communication system that comprises an optimization unit. In addition, according to an example embodiment of the present invention, the communication system comprises a plurality of functional units that are designed to transmit data to the optimization unit via corresponding transmission paths and to receive data from the optimization unit. Moreover, according to the third aspect of the present invention, the communication system comprises a safety protocol unit that is designed to transmit the data between the optimization unit and the plurality of functional units using a safety protocol. The communication system of the third aspect is designed to execute the method according to the first general aspect of the present invention and/or to execute the computer program according to the first general aspect.

The techniques of the first to third general aspects can have one or more of the following advantages.

Firstly, in comparison to some techniques of the related art, the present techniques can make it possible to achieve better distribution of communication resources in a communication system for a vehicle (in real time) by taking into account a number of corresponding subfunctions or functions if the communication resources are not available for executing all functions and/or all subfunctions of a function for the vehicle (an error with respect to the lack of communication resources). In this connection, the functions (and their subfunctions) of the present techniques cooperate not only in terms of protection but also with the aim of achieving the best possible overall performance of the communication system for the vehicle at a particular point in time by means of a safe method. If, for example, the available communication resources do not make it possible to transmit a video image of sufficient quality to a function for autonomous driving and the vehicle speed therefore has to be reduced, other data (for example, from LIDAR systems, radar systems, ultrasonic sensors or the like) are no longer required in high resolution. By throttling these components as well, the communication resources for video transmission are freed up again, as a result of which better transmission and thus better overall performance (in this example, higher vehicle speed) can be achieved.

Secondly, the techniques of the present disclosure provide the ability to provide fine-grained gradation of the overall performance of the communication system, as a result of which higher overall performance in comparison to some techniques of the related art can be achieved.

Some terms are used in the present disclosure in the following way:

The term “communication system” is understood as any infrastructure for the transmission of data via corresponding transmission paths within this communication system. The communication system of the present disclosure can comprise systems inside a vehicle and/or outside the vehicle. A non-exhaustive list of such systems comprises functional units (for example, functional units inside the vehicle or functional units external to the vehicle, such as data cloud systems), vehicle components (for example, sensor units), an optimization unit, a predictive quality-of-service unit that can be connected by corresponding transmission paths of the communication system and communicate with one another via corresponding transmission paths. Such a communication system can also comprise systems such as vehicle computers (VCs), electronic control units (ECUs), which are, for example, realized on a microcontroller basis, or communication nodes such as gateways or switches. In some cases, a vehicle computer can contain one or more physical or virtual switches, system-on-a-chip (SoC) hardware with a plurality of CPU cores, co-processors and powerful graphics cards, on which, for example by means of a hypervisor, a plurality of virtual machines (VMs) execute various operating systems connected via a virtual switch (for example, implemented in the hypervisor). In addition, communication systems can contain a bus system, with which a plurality of logical communication connections can be realized via a physical transmission path (i.e., a communication channel). One possible example of such a bus system in the vehicle sector is the controller area network bus system (CAN bus system). VCs communicate with the aforementioned systems in the vehicle, outside the vehicle, or with other VCs or ECUs (any combination of these alternatives is also possible). Moreover, one or more systems of the communication system can be structured internally in the same way as a communication system and comprise a plurality of other systems.

The term "transmission path" is understood as a communication path (or communication route) between functional units located inside and/or outside the vehicle, which can communicate with one another via the communication path. Additionally or alternatively, a transmission path can refer to communication paths between corresponding components (for example, vehicle components or components not belonging to the vehicle) that can communicate directly with one another or via other systems (for example, functional units). A transmission path can comprise one or more physical transmission links, which in each case transmit data by means of a communication protocol (for example, by means of a safety protocol). The one or more physical transmission links of the transmission path can extend inside and/or outside the vehicle. The two functional units (or two components) can be connected to one another via a plurality of (different) transmission paths, as is the case when using multipath communication technologies (for example, multipath TCP, multipath transmission control protocol). The transmission path can use one or more communication protocols (for example, WLAN protocols of the IEEE 802.11 family, for example 802.11ah or later protocols) for data packet transmission. A transmission path can comprise one or more wireless transmission links and/or one or more wired transmission links. On the wired transmission link (for example within the vehicle), data can be transmitted by means of a wired connection. Data are transmitted on the wireless transmission path (or a part thereof) by means of a wireless communication connection, in particular a radio connection. The radio connection can be a WLAN connection, a mobile radio connection, for example UMTS, GPRS, 4G, LTE or 5G connection, or another technology.

The term "function" comprises control-based functions of a vehicle, for example functions of driving assistance systems or parking assistance systems, functions for autonomous or semi-autonomous driving, functions of an entertainment system and functions for the reception, transmission and storage of various data between different systems (for example, functional units) of the communication system for a vehicle (or any combination of the aforementioned functions). Within the scope of the present disclosure, functions in conjunction with air conditioning systems and/or electronic systems for controlling functions of the interior are also possible. A corresponding "functional unit" can be responsible for the executability of the function, which functional unit can, for example, communicate with corresponding systems of the communication system, for example components (for example, vehicle components), other functional units (for example, functional units within the vehicle or functional units external to the vehicle, such as data cloud systems) or a combination thereof.

The term "component" is understood as any internal vehicle components of a vehicle and any systems external to the vehicle, such as components of a data cloud system. Sensors or sensor systems (for example, camera-based systems, LIDAR systems, RADAR systems, ultrasonic sensor systems) can be vehicle components. A vehicle component can be an engine (for example, an internal combustion engine, an electric engine, a hybrid engine or a fuel cell or parts of an engine, such as a turbocharger), a control device (for example, an engine control unit), a battery or other energy-receiving systems, components of a powertrain (for example, a transmission), assistance systems (for example, brake assistants, lane keeping assistants, parking assistants), air conditioning systems, or electronic systems for controlling functions of the interior. A vehicle component can also be a part of the systems described above or a combination of a plurality of the systems described above (or parts thereof).

The term "communication resource" refers to any resources of the communication system that, in their entirety, ensure the (full or partial) executability of one or more functions of the communication system for a vehicle. The term "communication resource" comprises, for example, properties of a communication connection via a transmission path or a plurality of transmission paths in the case of multipath communication (for example, using multipath TCP), which is described as a set of transmission parameters. The corresponding communication can be carried out, for example, between functional units/components internal to the vehicle or external to the vehicle via one or more radio networks, for example 5G, LTE mobile radio networks or WLAN networks, or via near-field communication connections or Bluetooth. These transmission parameters include, for example, a data rate, a transmission capacity, a transmission latency, a transmission bandwidth, a transmission reliability (for example, maximum frame loss, maximum number of bit toggles, maximum probability of CRC errors, necessity of redundant transmission such as with the IEEE Std 802.1CB-2017 method), a jitter (maximum permissible variance of the transmission delay) or a combination thereof. In addition, communication resources can also include other properties of the communication connection, such as IT security and/or functional safety or reliability. IT security can relate to the protection of data (for example, messages), including with regard to their integrity, if a message must not be changed in transit (for example, during the transmission of data within a communication system and/or between the communication system and other systems). On the other hand, functional safety or reliability in the present technologies is understood as operational safety (which can deteriorate, for example, if the transmission delay is too long), i.e., the protection of people and the environment.

Accordingly, the term "communication resource requirement" comprises a requirement for the corresponding "communication resources" that are needed for the (full or partial) executability of the "function." The communication resource requirement can comprise, for example, a request (for example, in the form of a request signal) for the transmission parameters defined above, safety requirements or a combination thereof. In some cases, this communication resource requirement can be transmitted to an optimization unit and/or a central location in the vehicle (for example, to a vehicle computer) (more on this below).

The term "quality of service" comprises the quality of a communication connection (also referred to as "quality of service" or "QoS") via a transmission path, the quality being described by means of a set of transmission path parameters defined above.

In the present disclosure, the term "executability level" of a function (or, in other words, a performance level of a function or a utility of a function) expresses the extent to which the function can be executed under certain circumstances, for example on the basis of the communication resources available for said function. In some cases, the communication resources available for the function may be sufficient so that the function can be fully executed (i.e., with the maximum executability level): If, for example, the cameras of a vehicle require a data rate of at least 4 Mbit/s in order to ensure the full executability of the parking assistant function, and the communication system provides the cameras with this communication resource (i.e., the data rate of at least 4 Mbit/s), then the parking assistant function is fully executed. Otherwise, if the available communication resources are limited, the function is executed partially or, in other words, with a restricted executability level (in the example above, this would be the situation in which, for example, the data rate of 2 Mbit/s is made available to the cameras). As explained in more detail below, there may be various restricted executability levels of the function: In a non-exhaustive example, the function can be classified as "works fully," "works to a limited extent," "works to a very limited extent" or "does not work." In some cases, the executability level can be characterized by a value. For example, different executability levels can be expressed as numbers in a predefined interval or as a percentage. In other cases, the executability level can be represented by a value that is associated with the function and can be achieved under the available communication resources, for example, a maximum driving speed, a level of autonomy (driver of an L3+ vehicle may be prompted to take over the vehicle), an imaging resolution, a braking force, or a maximum steering angle. In addition, a "utility function", which describes the "utility of the function" as a function of the communication resources, can be defined in this connection (more on this below).

The "optimization unit" of the present disclosure refers to a unit that can distribute the available communication resources between the "functional units" by optimizing, such that the individual communication resource requirements of all the functional units as a whole can be best served. The optimization unit can be a unit or a distributed system that communicates, for example, via a wired or radio connection (for example, WLAN connection or mobile radio connection).

A predictive quality-of-service unit (or pQos unit for short) is understood as a unit (for example, a unit of a vehicle) that is used for a service to predict future properties of the communication connections within the communication system.

The term "data cloud system" is an infrastructure that is made available via a network, for example via the Internet. A "data cloud system" usually includes storage space, computing power and/or application software as a service (i.e., a functional unit of the vehicle, a component of the vehicle, a user or a combination thereof can use these resources via the network). In other words, a "data cloud system" is an infrastructure that is made available via a network, without having to be present/installed on the local system. "Data cloud systems" can contain distributed resources (for example, a plurality of computer systems at different locations). The resources of the "data cloud system" are offered and used via technical interfaces and protocols, for example by means of a web browser. In one example, an automated driving function can be connected to the "data cloud system" using 5G radio technology.

The term "data" is understood, for example, as data packets, video data, voice data, measurement data, control data, messages or data containing communication resource requirements. The data can comprise data generated and provided by, for example, one or more functional units, vehicle components, an optimization unit, a predictive quality-of-service unit (or pQos unit for short) or a combination thereof. The data can be generated in a vehicle and/or at remote locations external to the vehicle (for example, in a data cloud system) and made available (for example, to a corresponding functional unit of the vehicle). The data of the present disclosure can also comprise signals that are detected for the vehicle during operation of the vehicle or have been detected in the past. These are the signals from vehicle components of the vehicle, which are generated, for example, by corresponding sensors, with which the vehicle components are equipped or which are located in the vicinity of the respective vehicle components. Data can also contain coded data, for example, data that have been coded using a coding technique.

The term "vehicle" comprises any device designed for the transportation of passengers and/or cargo. The vehicle can be a motor vehicle (for example, an at least partially autonomously operating/assisted motor vehicle, in particular a car or a truck). However, the vehicle can also be a ship, a train, an aircraft or a spacecraft. In addition, the vehicle in the present disclosure can comprise a partially or fully autonomous robot (for example, an industrial robot).

BRIEF DESCRIPTION OF THE DRAWINGS

FIG. 1A is a flow chart illustrating an example of a method for distributing communication resources between subfunctions of a function of a communication system for a vehicle according to the first aspect of the present invention.

FIG. 1B is a flow chart showing further possible method steps according to the first aspect of the present invention.

DETAILED DESCRIPTION OF EXAMPLE EMBODIMENTS

Figure 2:
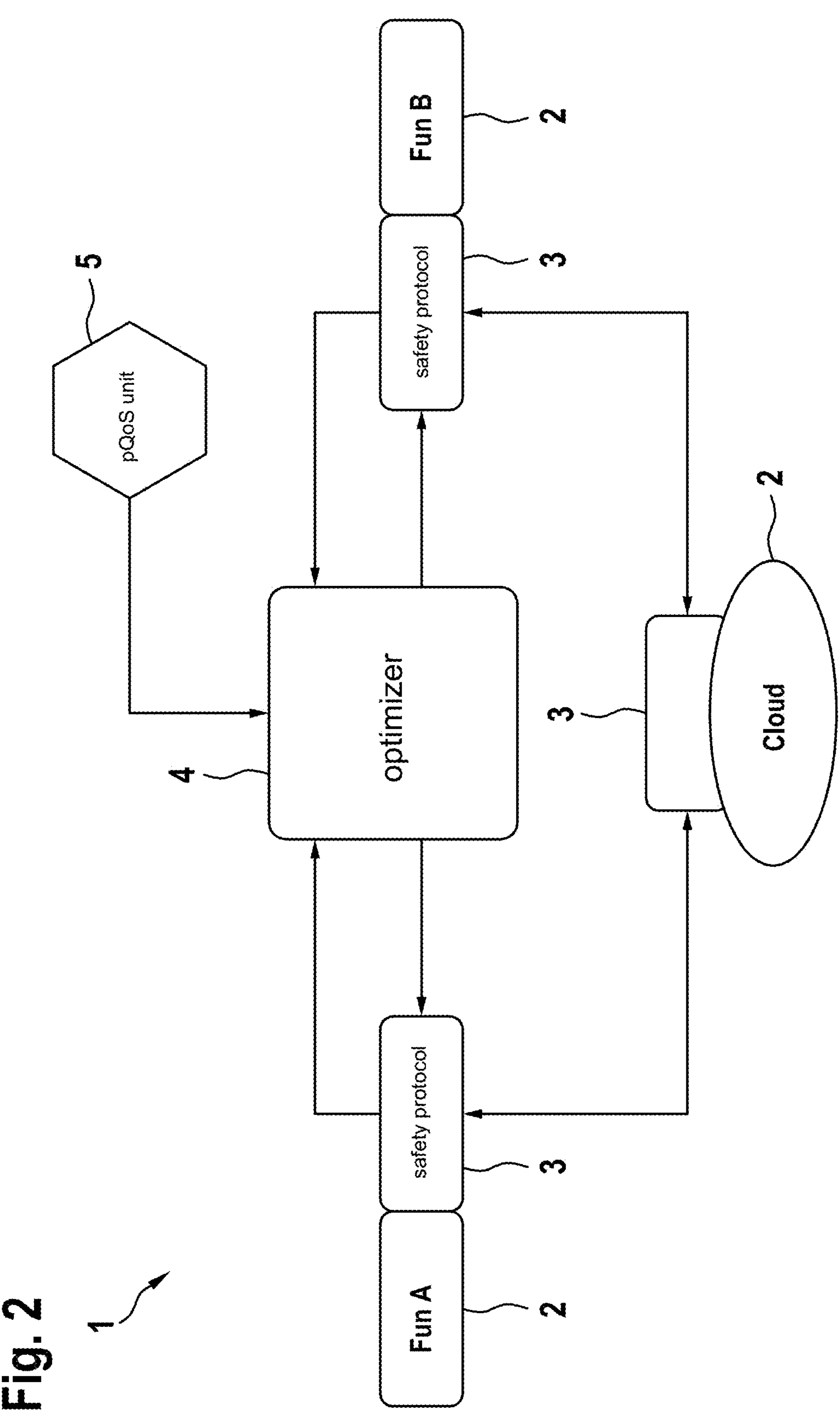
FIG. 2 schematically shows an exemplary architecture according to the present invention of a communication system 1 for a vehicle, which comprises an optimization unit 4, two functional units of the vehicle "2; Fun A; Fun B," a data cloud system "Cloud," which communicate with one another using a safety protocol 3. In addition, the communication system 1 comprises a predictive quality-of-service unit (or pQos unit for short) 5, which is connected to the optimization unit 4.
Figure 3:
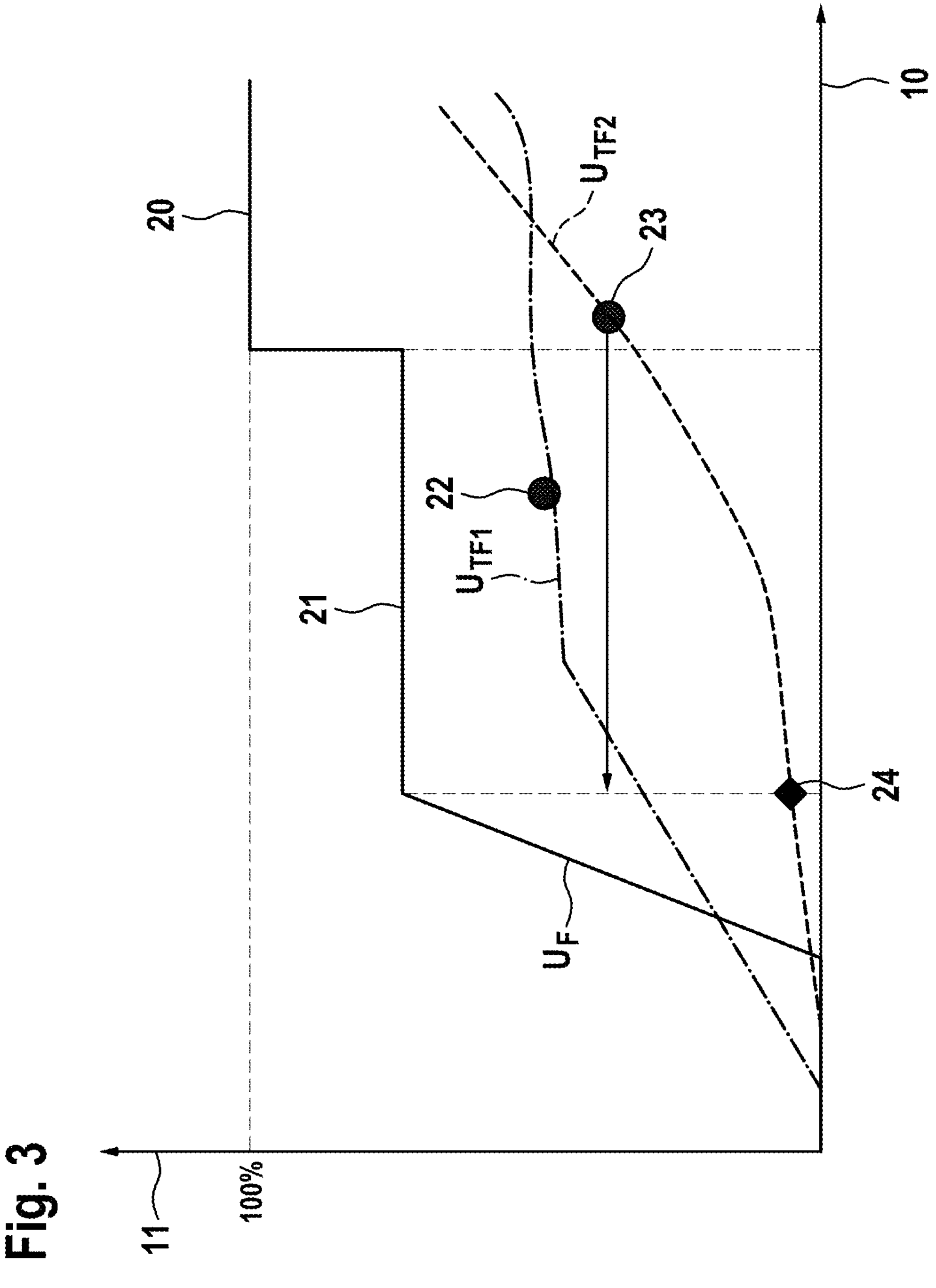
FIG. 3 schematically shows an exemplary utility function ($U_F$) with two respective utility subfunctions ($U_{TF1}$; $U_{TF2}$) as a function of a communication resource 10.

Initially, techniques for distributing communication resources between subfunctions of a function of a communication system for a vehicle are described with reference to FIG. 1A to 1B. An exemplary structure of a communication system is then discussed with reference to FIG. 2. Finally, FIG. 3 illustrates further aspects with respect to the method of the present disclosure.

As outlined in FIGS. 1A and 1B, a first general aspect relates to a method for distributing communication resources (for example, in the form of available communication connections with their properties as already discussed above) between subfunctions of a function of a communication system 1 for a vehicle, wherein the function is designed to be executed in two or more executability levels 11 (for example, in three or more, four or more, five or more, or six or more executability levels). As mentioned above, a function 2 (see the labels "Fun A," "Fun B" in FIG. 2) can be a function related to autonomous driving, semi-autonomous driving, or driving assistance systems or parking assistance systems, as well as a video transmission function or audio transmission function, a sensor-based function, a control function or a combination thereof. In some cases, the function can be a function external to the vehicle (for example, the one assigned to a data cloud system 2, see the label "Cloud" in FIG. 2). These functions can comprise subfunctions that, in their entirety, make the (full or partial) executability of the respective functions possible. The method steps of some features are shown in the boxes drawn by solid lines in FIGS. 1A and 1B, while the method steps are shown in the boxes represented by dashed lines.

The first step of the method comprises ascertaining 100 a communication resource requirement of a function "2; Fun A; Fun B; Cloud" at a first executability level 20, wherein a communication resource 10; 22; 23 is required to execute the function (see definitions above). For example, the first executability level of the function can correspond to the full executability of the function (more on this below). In one example, the communication resource requirement of the function can be ascertained by a control device of a vehicle (for example, by a vehicle computer), which reads in a request signal from a corresponding functional unit responsible for the executability of this function. In some cases, the control device can be connected to the functional unit using a respective interface. Alternatively or additionally, the communication resource requirement of the function can be read by an optimizer unit 4 (see the label "Optimizer" in FIG. 2 and further discussions).

In some instances of the present disclosure, a utility function can be allocated to the communication resource requirement of the function, wherein the utility function describes the executability level of the function as a function of the communication resources. In one example, the utility function can have a binary characteristic: If, for example, a certain communication resource requirement of the function is met, then the function is executed with the maximum executability level, which is characterized by a value. Otherwise, if this communication resource requirement is not met, the function is not executed and the executability level is indicated by another value. Back to the example above: If the data rate of 4 Mbit/s is available for the two cameras, a parking assistant function is fully executed and the executability level can be 1 (or 100%). Otherwise, if the available data rate for one of the two cameras is less than 4 Mbit/s, the parking assistant function will not be executed and the executability level can be 0 (or 0%). In the other examples, the utility function can be a staircase function (i.e., the function that takes a number of function values and is piecewise constant), wherein each step of the staircase function corresponds to a corresponding executability level of the function. For example, the staircase function can comprise three or more, four or more, five or more steps, which have different values. In a non-exhaustive example with four steps, these steps, which describe the corresponding executability levels, can have the following values: 0.00 or 0% (the function "does not work"), 0.33 or 33% (the function "works to a very limited extent"), 0.66 or 66% (the function "works to a limited extent"), 1.00 or 100% (the function "works fully"). In the example of the parking assistant function, the aforementioned executability levels can be the corresponding ratios between the distances that the parking assistant function can estimate with the available communication resources and the maximum distance that the parking assistant function can provide.

In the example of FIG. 3, a utility function Up is shown as a one-dimensional function of a communication resource (for example, a data rate, a transmission capacity or another transmission parameter mentioned above). (In this figure, the communication resource is shown on the x-axis and the executability level on the y-axis) In other cases, the utility function can be a multi-dimensional function of a plurality of communication resources (for example, a data rate, a transmission capacity and a transmission latency in a three-dimensional case), wherein the dimension corresponds to the number of communication resources required for the respective function to be executable.

In the present techniques, the function comprises two or more subfunctions, which together provide the first executability level of the function. In other words, without one of these two or more subfunctions, the function cannot be executed and is therefore useless. In some cases, a corresponding component can be assigned to each of the two or more subfunctions of the function, as a result of which two or more components are formed, which are connected to the corresponding functional unit (for example, via corresponding transmission paths). In one example, each subfunction of the two or more subfunctions of the function can have a corresponding communication resource requirement, wherein a utility subfunction is allocated to the communication resource requirement of the subfunction. This utility subfunction can describe (according to the same principle as the utility function described above) an executability level of the subfunction as a function of the communication resources. Back to the example in FIG. 3: The two utility subfunctions "$U_{TF1}$; $U_{TF2}$" are shown as one-dimensional functions of a communication resource, which together lead to the dependence (shown in FIG. 3) of the utility function $U_F$ on the communication resource. For example, the utility subfunction $U_{TF1}$ can describe the executability level of a front camera, while the utility subfunction $U_{TF2}$ corresponds to the executability level of a rear camera. The two subfunctions (for example, front camera function and rear camera function) together define, for example, a parking assistant function, whose executability level is given by the utility function $U_F$ shown in FIG. 3.

As mentioned above, the maximum executability level of the function, which corresponds to the full executability of the function, can be selected as the first executability level of the function (introduced above). In the example of FIG. 3, the first executability level 20 can correspond to a value of 100% if the available communication resources 10 allow this. In other examples, the first executability level can be selected differently, for example if it corresponds to a partial executability of the function (in the example of FIG. 3, the value for the first executability level in this case is less than 100%, for example 80% or more, 90% or more).

In the next step, the method of the first aspect comprises checking 200 whether the communication resource requirement of the function is able to be met with available communication resources. This step can, for example, be performed by the aforementioned control device and/or optimization unit. Furthermore, the method of the first aspect comprises determining 300 at least one subfunction of the two or more subfunctions that is able, with the available communication resources, to provide not the first executability level of the function but rather a second executability level 21 of the function that is restricted in relation to the first executability level, if the communication resource requirement is not able to be met. The designation "the second executability level" of the function does not mean that this function can only be executed in two different executability levels: As described above, the function can be executed in various restricted executability levels. Therefore, "the second executability level" of the function is used here to make it clear that it is restricted in comparison to the first executability level (which corresponds, for example, to the full execution of the function). In other words, each of the different executability levels of the function that is restricted in comparison to the first executability level can be referred to as the second executability level. In some cases, the second executability level can be determined as a function of the available communication resources in comparison to the communication resource requirement of the function.

For example, the second executability level of the function (for example, a parking assistant function) can correspond to a plateau value 21 of a utility function $U_F$ in FIG. 3, which is less than 100%, so that the executability of this function is restricted. In other examples, the second executability level can correspond to another value, which is, for example, on a more linear section of the utility function $U_F$ in FIG. 3. In one example, the communication resources available for the two subfunctions (for example, front camera function and rear camera function) may not be sufficient (see two exemplary filled circles 22 and 23 in FIG. 3) to achieve the first executability level of the function (for example, the parking assistant function) (for example, the first executability level in FIG. 3 is 100%). More precisely, the communication resources required for the first subfunction (for example, front camera function) are too low in this connection (see the filled circle 22 on the first utility subfunction $U_{TF1}$ in FIG. 3). For example, in order to ensure that the parking assistant function can be fully executed, the front camera requires a data rate of at least 4 Mbit/s, whereas only 2 Mbit/s is made available to it. The next step of the method comprises distributing 400 available communication resources between the two or more subfunctions based on the communication resource requirement of the function (for example, on the basis of corresponding communication resource requirements of the subfunctions of the function). In the techniques of the present disclosure, distributing the available communication resources can comprise restricting 500 the available communication resources 23, 24 for one or more other subfunctions from the two or more subfunctions that differ from the at least one subfunction, so that the two or more subfunctions provide the second executability level of the function following the restriction.

As already discussed above, the function shown in FIG. 3 comprises two subfunctions, which are given by the utility function $U_F$ and two respective utility subfunctions "$U_{TF1}$; $U_{TF2}$." If the communication resources required for the first subfunction (for example, front camera function) are not sufficient (see the filled circle 22 on the first utility subfunction $U_{TF1}$), the communication resources sufficient for the second subfunction (for example, rear camera function) (see the filled circle 23 on the second utility subfunction $U_{TF2}$) can be reduced to the diamond 24 shown in this figure, without impairing the second executability level 21 of the function (for example, parking assistant function). In fact, the plateau value 21, which describes the second executability level of the function, is independent of the communication resources corresponding to the filled circle 22 and the diamond 24. In other words: If, for example, the available communication resources (for example, the data rate or data throughput) for the front camera do not permit full execution of the parking assistant function, then the communication resources for the rear camera can also be reduced, provided that the executability level of the parking assistant function remains at the same level. Another example: If the available communication resources do not allow the transmission of a video image in sufficient quality and therefore the vehicle speed has to be reduced, other data from other components, such as sensors or sensor systems (for example, camera-based systems, LIDAR systems, RADAR systems, ultrasonic sensor systems), are no longer required in high resolution (in comparison to the case that the transmission of a video image in sufficient quality is provided). In some cases, throttling these components can again free up communication resources for the video transmission, which leads to better transmission and thus to a higher executability level of the function (for example, higher vehicle speed) (in comparison to the case that no restriction of the available communication resources occurs).

Furthermore, the method of the first aspect can comprise determining that at least a first subfunction of the two or more subfunctions that is able, with the available communication resources, to provide not the second executability level of the function but rather another executability level from the two or more executability levels of the function that is restricted in relation to the second executability level. In this connection, the other executability level can be a third executability level, a fourth executability level or another executability level of the function in which this function can be executed and which is restricted in relation to the second executability level. Back to the example in FIG. 3: At a particular point in time (for example, if the function is in operation), it can be determined that the available communication resources slip downwards, so that the function cannot be executed in the second executability level (for example, the available communication resources for the subfunction $U_{TF1}$ fall below the value corresponding to the diamond 24 in FIG. 3). In this case, the method can comprise distributing available communication resources between the two or more subfunctions based on the communication resource requirement of the function. In the techniques of the present disclosure, distributing the available communication resources can comprise restricting the available communication resources for one or more other subfunctions from the two or more subfunctions that differ from the at least first subfunction, so that the two or more subfunctions provide the other executability level of the function following the restriction. In some cases, this restricting can be carried out in a similar manner to the "restricting 500" step (introduced above) with respect to the first and second executability levels previously discussed in connection to FIG. 3. In other words, depending on the available communication resources, the function can gradually reduce its executability level (for example, if the function is in operation). As already mentioned above, the function can, for example, be executed in the third executability level at a particular point in time, which is restricted in relation to the second executability level. At another particular point in time, when the available communication resources are further reduced, the function can, for example, be executed in the fourth executability level, which in turn is restricted in comparison to the third executability level.

The present techniques can furthermore comprise a plurality of functions of the communication system for the vehicle. In some cases, a function from the plurality of functions can be assigned a corresponding functional unit, which requires a respective communication resource in order to provide said function, as a result of which a plurality of functional units is formed. In line with the above discussions, each function from the plurality of functions can be executed in two or more executability levels. In one example, the first executability level of a function from the plurality of functions may be equal to the first executability level of another function from the plurality of functions (for example, the first executability level for these functions may correspond to the full executability of the functions). In other examples, the first executability level of one function from the plurality of functions may be different from the first executability level of another function from the plurality of functions (for example, the first executability level for one of these functions may describe a partial executability of the function). In some cases, a communication resource requirement for two or more functions from the plurality of functions (for example, if one of the two or more functions is a data cloud function) can be allocated an overall utility function, wherein the overall utility function describes the executability level of the two or more functions as a function of the communication resources.

Furthermore, the method of the first aspect can comprise distributing 410 available communication resources between a number of functions (for example, all functions) of the plurality of functions based on the communication resource requirement for each function from the number of functions if the communication resource requirement is not able to be met for at least one function of the plurality of functions. In the techniques of the present disclosure, distributing the available communication resources can comprise restricting the available communication resources for one or more other functions from the number of functions that differ from the at least one function, so that each function from the number of functions provides at least the respective second executability level following the restriction. In some cases, one or more functions from the number of functions can further have the (better) first executability level. It should be noted that such a distribution of the available communication resources between the functions and/or subfunctions of a function can lead to a better overall performance of the plurality of functions.

In a next step, the method of the first aspect can comprise determining that at least a first function of the plurality of functions that is able, with the available communication resources, to provide not the second executability level of the function but rather another executability level from the two or more executability levels of the function that is restricted in relation to the second executability level. (The designation “the at least first function” does not mean that this function or functions have any special properties in comparison to the other functions. It is only used to make it clear that this function or functions cannot be executed with the respective second executability level) As already described above, the other executability level can be a third executability level, a fourth executability level or another executability level of the first function in which the first function can be executed and which is restricted in relation to the second executability level. In this case, similarly to what is discussed above in the context of subfunctions of a function, the method can comprise distributing available communication resources between a number of functions of the plurality of functions based on the communication resource requirement for each function from the number of functions. In the techniques of the present disclosure, distributing the available communication resources can comprise restricting the available communication resources for one or more other functions from the number of functions that differ from the at least first function, so that each function from the number of functions provides at least the respectively other executability level following the restriction. In addition, as described above in the context of subfunctions of a function, the first function can, as a function of the available communication resources, gradually reduce its executability level so that it can be executed at a next possible executability level (for example, at the third executability level, which is restricted in relation to the second executability level, if the second executability level cannot be adhered to). Moreover, each function from the number of functions will provide at least this next possible executability level after the respective restriction.

In the techniques of the present disclosure, restricting the available communication resources for the one or more other functions from the number of functions can comprise adjusting transmission parameters (for example, a data rate, a transmission capacity or one or more other transmission parameters defined above) of the one or more other functions from the number of functions. In some cases, internal parameters of the components connected to the respective functional unit responsible for the executability of the function can be adjusted (for example, changed). This adjustment can have the result that these components will continue to work with limited communication resources, in order to ensure a corresponding executability level of the function. For example, the internal parameters of the cameras of a parking assistance system can be adjusted such that they transmit lower resolution videos to the parking assistance function, which will then work with a corresponding executability level.

In the present techniques, functions from the plurality of functions can communicate with one another using a safety protocol 3 (for example, data are transmitted between the respective functional units via one or more wireless or wired transmission paths using one or more safety protocols). In the techniques of the present disclosure, distributing 410 available communication resources between the number of functions can be performed using the safety protocol. In some cases, a safety protocol unit (for example, in a vehicle) can make communications between functional units possible.

In the present techniques, the plurality of functions can comprise a data cloud function that communicates with one or more other functions from the plurality of functions. For example, a function from the plurality of functions (for example, an automated driving function) needs to communicate with the corresponding data cloud function (for example, a data cloud service that provides predictions of expected connection properties at a location at a particular time) in order to be executed (for example, in order to provide a corresponding executability level of the function). In some cases, a data cloud system can be assigned to the data cloud function from the plurality of functions. In addition, one or more functional units of the communication system can be connected to the data cloud system via one or more corresponding transmission paths. In one example, data can be transmitted between one or more functional units (for example, each functional unit) from the one or more other functional units and the data cloud system using the safety protocol. The example in FIG. 2 shows an exemplary architecture of a communication system 1 for a vehicle, in which two functional units of the vehicle "2; Fun A" and "2; Fun B" communicate via respective transmission paths with a data cloud system using a safety protocol 3. In some cases, the function can send a request (for example, in the form of a request signal) and/or payload to the data cloud function, and the data cloud function can transmit requested information (for example, requested payload and/or additional metadata for protection) to the function.

In the present disclosure, the step of distributing 400 available communication resources of the function between two or more subfunctions of the function can comprise optimizing 450 the available communication resources of the function between two or more subfunctions of the function. Alternatively or additionally, the step of distributing 410 available communication resources between the number of functions of the plurality of functions can comprise optimizing 460 the available communication resources of the plurality of functions between the number of functions. Here, for example, the distributing 400; 410 can be performed using an optimization unit 4, wherein the optimization unit is connected to a number of functional units of the plurality of functional units (for example, to one or more functional units internal to the vehicle). In one example, data can be transmitted between each functional unit of the number of functional units and the optimization unit via one or more respective transmission paths using the safety protocol. In the example in FIG. 2, the two functional units of the vehicle "2; Fun A" and "2; Fun B" communicate with the optimization unit "4; Optimizer" using the safety protocol 3 via two respective transmission paths.

Furthermore, the method of the first aspect can comprise transmitting information about the communication resource requirement of the corresponding function from the corresponding functional unit "2; Fun A; Fun B" to the optimization unit 4. In some cases, information can comprise data about the communication resource requirement of the respective function (for example, in the form of a request signal), which is assigned to the corresponding functional unit.

Thereafter, the optimization unit 4 can perform the "Optimizing 450; 460" steps introduced above for the available communication resources, for example by using a solution algorithm (for example, the simplex method). In one example, the solution algorithm can be an optimization method that creates a target function and minimizes (or maximizes) it with respect to the corresponding variables in order to distribute the available communication resources (in the sense defined above). In some cases, the target function can link, weight and prioritize (or use any combination thereof) the various communication resource requirements of the functions and/or their subfunctions so that the communication resource requirements appear as corresponding variables in the target function. Moreover, the target function can comprise internal parameters of the components as variables, wherein the components contribute to the execution of the corresponding function. In addition, the target function can be variable over time in order to take into account the changing importance and urgency of individual functions and/or subfunctions. In another exemplary embodiment, heuristics and/or approximations can also be used additionally or alternatively to optimize the available communication resources.

In the next step, the method can comprise transmitting information about the distribution of the available communication resources for the corresponding function from the optimization unit 4 to the corresponding functional unit "2; Fun A; Fun B," wherein the information comprises data about the distribution of the available communication resources. With these distributed communication resources, the plurality of functions can work after the distribution (for example, after a predefined time interval after which the distribution is performed). In some examples, this can mean that one or more functions (for example, all functions) from the number of functions provide the respective second (or another) executability level during operation. In other cases, this can mean that the communication system is switched to another operating mode (for example, to the operating mode with restricted executability of a number of functions or all functions in comparison to the case in which all functions have the first executability level).

Furthermore, the step of "checking 200" of the first aspect as to whether the communication resource requirement of the function is able to be met with the available communication resources can further comprise predicting 600 a future communication resource for the function (for example, a function from the plurality of functions). In addition, distributing 400 the available communication resources between two or more subfunctions can still be done based on the predicted future communication resource for the function if the communication resource requirement of the function is not able to be met. In some cases, the method of the present disclosure can comprise predicting 610 future communication resources for the plurality of functions, wherein distributing 410 the available communication resources between the number of functions of the plurality of functions is done based on the predicted future communication resources for the plurality of functions if the communication resource requirement for the at least one function of the plurality of functions is not able to be met.

For example, predicting the future communication resources for the plurality of functions can be performed using a pQos unit 5, wherein the pQoS unit is connected to the optimization unit 4. (In the example in FIG. 2, a pQoS unit 5 is connected to the optimization unit 4 via a transmission path) Furthermore, the method can comprise transmitting information about the predicted future communication resources for the plurality of functions from the pQos unit to the optimization unit. In some cases, the information transmitted by the pQos unit can contain data about an estimated future quality of service of the respective transmission paths. With this estimate, together with the communication resource requirements imposed by the functions, the optimization unit can ascertain, for example, whether and when the communication resource requirements for one or more functions and/or their subfunctions will be met (for example, with what probability). An optimal distribution of the available communication resources can be better achieved by the optimization unit than in the case in which the pQoS unit is not present.

In the next step, the present techniques can comprise activating measurement procedures by the safety protocol in order to detect a state of the available communication resource for the functional unit from the one or more functional units along the respective transmission path from the functional unit to the data cloud system (for example, from the functional unit "Fun A" and/or "Fun B" to the data cloud system "Cloud" of FIG. 2), wherein the functional unit is assigned to the corresponding function. The method can then comprise comparing the state of the available communication resource with the communication resource requirement of the corresponding function in order to determine a deviation between the available communication resource and the communication resource requirement of the corresponding function. Subsequently, the techniques of the present disclosure can comprise transmitting information about the state of the communication resource to the respective functional unit and/or the optimization unit if the state of the communication resource does not meet the communication resource requirement of the corresponding function.

Furthermore, the method can comprise updating the distribution of the available communication resources (i.e., the step of "distributing 400; 410" introduced above is performed again) if the determined deviation between the available communication resource and the communication resource requirement of the corresponding function meets a predetermined criterion. In one example, the predetermined criterion can comprise that the determined deviation exceeds a predetermined threshold value (for example, a deviation with respect to a data rate, a jitter, a transmission latency or a combination thereof along a transmission path from the functional unit to the data cloud system).

In the present techniques, the step of "activating measurement procedures" can be carried out by the safety protocol according to a schedule. For example, the schedule can comprise that activating measurement procedures is performed after a predefined time interval. Alternatively or additionally, the step of "activating measurement procedures" can be carried out by the safety protocol after a predetermined trigger event. For example, the predetermined trigger event can occur if a software application is started that requires a respective communication resource of the functional unit from the one or more functional units.

A second general aspect of the present disclosure relates to a computer program that is designed to execute the method according to the first general aspect of the present disclosure. The present disclosure also relates to a computer-readable medium (for example, a machine-readable storage medium, such as an optical storage medium or read-only memory, for example, FLASH memory) and signals that store or encode the computer program of the present disclosure.

A third general aspect of the present disclosure relates to a communication system 1 for a vehicle, which comprises an optimization unit 4. In addition, the communication system comprises a plurality of functional units "2; Fun A; Fun B; Cloud" (for example, a video transmission function or audio transmission function) that are designed to transmit data to the optimization unit via corresponding transmission paths and to receive data from the optimization unit. Moreover, according to the third aspect, the communication system comprises a safety protocol unit that is designed to transmit the data between the optimization unit and the plurality of functional units using a safety protocol 3. In some cases, the data can comprise data about a communication resource requirement of a respective function, data about a distribution of available communication resources (for example, for one or more functions), data about an estimated future quality of service of the respective transmission paths or any combination thereof. In some cases, a transmission path can comprise one or more physical transmission links, which respectively transmit data using the safety protocol. The communication system of the third aspect is designed to execute the method according to the first general aspect of the present disclosure and/or to execute the computer program according to the second general aspect. The communication system can comprise at least one processor, at least one memory (which can contain programs that, if executed, perform the methods of the present disclosure) as well as at least one interface for inputs and outputs. The communication system of the third aspect can be a "stand-alone" system or a distributed system that communicates via the corresponding transmission paths.

In some examples, the communication system of the third aspect can comprise a data cloud system "Cloud" (for example, the data cloud system can be one of the plurality of functional units mentioned above). In addition, one or more functional units of the communication system can be connected to the data cloud system via one or more corresponding transmission paths. In one example, data can be transmitted between one or more functional units from the one or more functional units and the data cloud system using the safety protocol. As mentioned above, a "data cloud system" can provide storage space, computing power and/or application software as a service (i.e., a functional unit of the vehicle, a component of the vehicle, a user or a combination thereof can use these resources via the network).

The invention claimed is:

1. A method for distributing shared communication resources between subfunctions of a function of a communication system of a vehicle, wherein the function is configured to be executed in two or more predefined executability levels, the method comprising the following steps:

ascertaining a communication resource requirement of the function in a first predefined executability level, wherein the communication resource is required to execute the function, and wherein the function includes two or more subfunctions, which together provide the first predefined executability level of the function, the two or more subfunctions having corresponding communication resource requirements of the shared communication resources;

checking whether the communication resource requirement of the function is able to be met with available communication resources; and based on the communication resource requirement being not able to be met:

determining at least one subfunction of the two or more subfunctions that is able, with the available communication resources, to provide not the first predefined executability level of the function but rather a second restricted predefined executability level of the function that is restricted in relation to the first predefined executability level, and distributing the available communication resources between the two or more subfunctions based on the communication resource requirement of the function and the corresponding communication resource requirements of the two or more subfunctions, wherein the distributing of the available communication resources includes restricting the available communication resources for one or more other subfunctions from the two or more subfunctions that differ from the at least one subfunction, so that the two or more subfunctions provide the second restricted predefined executability level of the function following the restriction.

2. The method according claim 1, further comprising:

determining at least a first subfunction of the two or more subfunctions that is able, with the available communication resources, to provide not the second restricted predefined executability level of the function but rather another further restricted predefined executability level from the two or more predefined executability levels of the function that is restricted in relation to the second restricted predefined executability level; and distributing the available communication resources between the two or more subfunctions based on the communication resource requirement of the function, wherein the distributing of the available communication resources includes restricting the available communication resources for one or more other subfunctions from the two or more subfunctions that differ from the at least first subfunction, so that the two or more subfunctions provide the other further restricted predefined executability level of the function following the restriction.

3. The method according to claim 1, wherein the method distributes shared communication resources between a plurality of functions of the communication system for the vehicle, each of the plurality of functions being configured to be executed in at least the first and second predefined executability levels and wherein the method further comprise:

based on the communication resource requirement for at least one function of the plurality of functions is not able to be met:

distributing the available communication resources between a number of functions of the plurality of functions based on the communication resource requirement for each function from the number of functions, wherein the distributing of the available communication resources includes restricting the available communication resources for one or more other functions from the number of functions that differ from the at least one function, so that each function from the number of functions provides at least the respective second restricted predefined executability level following the restriction.

4. The method according to claim 3, further comprising:

determining that at least a first function of the plurality of functions is able, with the available communication resources, to provide not the second restricted predefined executability level of the function but rather another further restricted predefined executability level from the two or more predefined executability levels of the function that is restricted in relation to the second restricted predefined executability level; and distributing the available communication resources between a number of functions of the plurality of functions based on the communication resource requirement for each function from the number of functions, wherein the distributing of the available communication resources includes restricting the available communication resources for one or more other functions from the number of functions that differ from the at least first function, so that each function from the number of functions provides at least the respectively other further restricted predefined executability level following the restriction.

5. The method according to claim 3, wherein the restricting of the available communication resources for the one or more other functions from the number of functions includes adjusting transmission parameters of the one or more other functions from the number of functions.

6. The method according to claim 3, wherein functions from the plurality of functions communicate with one another using a safety protocol, and wherein the distributing of the available communication resources between the number of functions is performed using the safety protocol.

7. The method according to claim 3, wherein the plurality of functions includes a data cloud function that communicates with one or more other functions from the plurality of functions.

8. The method according to claim 1, wherein the distributing of the available communication resources of the function between two or more subfunctions of the function includes optimizing the available communication resources of the function between two or more subfunctions of the function.

9. The method according to claim 3, wherein the distributing of the available communication resources between the number of functions of the plurality of functions includes optimizing the available communication resources of the plurality of functions between the number of functions.

10. The method according to claim 1, wherein the checking of whether the communication resource requirement of the function is able to be met with the available communication resources further includes predicting a future communication resource for the function, wherein the distributing of the available communication resources between two or more subfunctions is done based on the predicted future communication resource for the function when the communication resource requirement of the function is not able to be met.

11. The method according to claim 3, further comprising predicting future communication resources for the plurality of functions, wherein the distributing of the available communication resources between the number of functions of the plurality of functions is done based on the predicted future communication resources for the plurality of functions when the communication resource requirement for the at least one function of the plurality of functions is not able to be met.

12. A non-transitory computer-readable medium on which is stored a computer program for distributing shared communication resources between subfunctions of a function of a communication system of a vehicle, wherein the function is configured to be executed in two or more predefined executability levels, the computer program, when executed by a computer, causing the computer to perform the following steps:

ascertaining a communication resource requirement of the function in a first predefined executability level, wherein the communication resource is required to execute the function, and wherein the function includes two or more subfunctions, which together provide the first predefined executability level of the function, the two or more subfunctions having corresponding communication resource requirements of the shared communication resources;

checking whether the communication resource requirement of the function is able to be met with available communication resources; and based on the communication resource requirement being not able to be met:

determining at least one subfunction of the two or more subfunctions that is able, with the available communication resources, to provide not the first predefined executability level of the function but rather a second restricted predefined executability level of the function that is restricted in relation to the first predefined executability level, and distributing the available communication resources between the two or more subfunctions based on the communication resource requirement of the function and the corresponding communication resource requirements of the two or more subfunctions, wherein the distributing of the available communication resources includes restricting the available communication resources for one or more other subfunctions from the two or more subfunctions that differ from the at least one subfunction, so that the two or more subfunctions provide the second restricted predefined executability level of the function following the restriction.

13. A communication system of a vehicle, comprising:

an optimization unit;

a plurality of functional units that are configured to transmit data to the optimization unit via corresponding transmission paths and to receive data from the optimization unit; and a safety protocol unit that is configured to transmit the data between the optimization unit and the plurality of functional units using a safety protocol;

wherein the communication system of the vehicle is configured to distribute shared communication resources between subfunctions of a function of the communication system of the vehicle, wherein the function is configured to be executed in two or more predefined executability levels, the communication system being configured to:

ascertain a communication resource requirement of the function in a first predefined executability level, wherein the communication resource is required to execute the function, and wherein the function includes two or more subfunctions, which together provide the first predefined executability level of the function, the two or more subfunctions having corresponding communication resource requirements of the shared communication resources;

check whether the communication resource requirement of the function is able to be met with available communication resources; and based on the communication resource requirement being not able to be met:

determine at least one subfunction of the two or more subfunctions that is able, with the available communication resources, to provide not the first predefined executability level of the function but rather a second restricted predefined executability level of the function that is restricted in relation to the first predefined executability level, and distribute the available communication resources between the two or more subfunctions based on the communication resource requirement of the function and the corresponding communication resource requirements of the two or more subfunctions, wherein the distributing of the available communication resources includes restricting the available communication resources for one or more other subfunctions from the two or more subfunctions that differ from the at least one subfunction, so that the two or more subfunctions provide the second restricted predefined executability level of the function following the restriction.

* * * * *